United States Patent [19]
Kirochko et al.

[11] Patent Number: 5,854,342
[45] Date of Patent: Dec. 29, 1998

[54] WATER-BORNE FLUOROELASTOMER COATINGS AND RELATED METHOD

[75] Inventors: Pavel Kirochko, Dover; James G. Kreiner, Green, both of Ohio

[73] Assignee: Lauren International, Inc., New Philadelphia, Ohio

[21] Appl. No.: 772,822

[22] Filed: Dec. 24, 1996

[51] Int. Cl.$^6$ .................................................. C08L 27/12
[52] U.S. Cl. ...................... 524/805; 524/806; 524/834; 524/837; 524/780; 524/789; 427/387; 428/447
[58] Field of Search ..................... 524/805, 806, 524/837, 834, 780, 789; 428/447; 427/387

[56] References Cited

U.S. PATENT DOCUMENTS

| | | | |
|---|---|---|---|
| 3,886,108 | 5/1975 | Snow, Jr. ............................. | 260/29.6 |
| 3,962,169 | 6/1976 | Arruda et al. ....................... | 260/29.6 |
| 4,225,482 | 9/1980 | Ferren et al. ........................ | 260/29.6 |
| 4,323,603 | 4/1982 | Close .................................. | 524/545 |
| 4,339,553 | 7/1982 | Yoshimura et al. ................ | 524/544 |
| 4,343,841 | 8/1982 | Close .................................. | 427/386 |
| 4,347,268 | 8/1982 | Close .................................. | 427/385.5 |
| 4,347,277 | 8/1982 | Slama et al. ....................... | 428/215 |
| 4,421,878 | 12/1983 | Close .................................. | 523/454 |
| 4,423,183 | 12/1983 | Close .................................. | 524/546 |
| 4,447,478 | 5/1984 | Close .................................. | 427/407.1 |
| 4,482,472 | 11/1984 | Yoshimura et al. ................ | 252/511 |
| 4,504,528 | 3/1985 | Zucker et al. ...................... | 427/389.8 |
| 4,555,543 | 11/1985 | Effenberger et al. .............. | 524/520 |
| 4,560,737 | 12/1985 | Yamamoto et al. ................ | 527/72 |
| 5,008,327 | 4/1991 | Shirai et al. ....................... | 524/544 |
| 5,194,335 | 3/1993 | Effenberger et al. .............. | 428/421 |
| 5,242,962 | 9/1993 | Jahn .................................. | 524/197 |

OTHER PUBLICATIONS

Dupont Viton® Bulletin, No. 5, Apr., 1961.
"Fluoroelastomer Films: New Solutions for Old Problems" by Jon Mennough, *Rubber World*, Dec. 1983.
"Fluoroelastomer Coating Halts Corrosion of High Alloy Expansion Joint" by York and Wickersham, *Chemical Processing*, Apr., 1987.
"Product Information", catalog of Ausimont USA, Inc. (1988).

*Primary Examiner*—Melvyn I. Marquis
*Attorney, Agent, or Firm*—Renner, Kenner, Greive, Bobak, Taylor & Weber

[57] ABSTRACT

A water-borne fluoroelastomer coating composition comprising an aqueous dispersion of a fluoroelastomer polymer; from about 0.1 to about 10 parts by weight of an amino/polyamino-siloxane curative per 100 parts by weight of the polymer; and, from 0 to about 40 parts by weight of an additive filler, per 100 parts by weight of the polymer, wherein there is sufficient water to provide a coating composition having a solids content of from about 10 to about 80 percent by weight. A method of coating a substrate with the fluoroelastomer coating composition of the present invention is also provided. Cured fluoroelastomer films, cured with amino/polyamino-siloxane curatives are also provided.

26 Claims, No Drawings

WATER-BORNE FLUOROELASTOMER COATINGS AND RELATED METHOD

TECHNICAL FIELD

The present invention is generally directed toward fluoroelastomer coating compositions. More particularly the present invention is directed toward water-borne fluoroelastomer compositions having improved pot life as well as improved adhesion to a variety of surfaces. Specifically, the water-borne fluoroelastomer coating compositions of the present invention contain an improved curative which is an oligomeric, amino/polyamino-siloxane curative. The present invention is also directed toward a method of applying the water-borne fluoroelastomer coating compositions and toward cured fluoroelastomer films.

BACKGROUND OF THE INVENTION

Fluoroelastomer coating compositions are well known. They typically comprise copolymers of vinylidene fluoride and hexafluoropropylene or terpolymers of vinylidene fluoride, hexafluoropropylene and tetrafluoroethylene.

Fluoroelastomers are well known for their heat, weather, solvent and chemical resistance. Furthermore, cured fluoroelastomer films typically exhibit good mechanical properties and adhere to a variety of surfaces. As a result of these properties, fluoroelastomer coating compositions are applied to protect a variety of surfaces including metals, plastics, rubbers, concrete, glass and the like.

Heretofore in the art, fluoroelastomer coating compositions have been applied using organic solvent systems. Typical solvent systems employed ketones or ethers. Such solvents, however, are hazardous to use inasmuch as they are flammable, toxic, and volatile. Moreover, growing environmental concern over the use of such volatile organic compounds restricts the use of such compounds in various areas of the country. Finally, the pot life of the fluoroelastomer coating compositions employing such solvents is generally only a few hours. Pot life, as it will be used herein, refers to the time required for the fluoroelastomer coating composition to begin gelation.

Water-borne fluoroelastomer coating compositions are also known. For example, DuPont de Nemours Company, of Wilmington, Del. teaches aqueous dispersions of their fluoroelastomer, Viton®, with a polyamine curing agent. The pot life of such dispersions, however, is relatively short, generally only 2 to 5 days. Ausimont U.S.A. also teaches aqueous dispersions employing their fluoroelastomer, TECNOFLON®, with aliphatic amines as curing agents. As with the dispersions taught by DuPont, those employing aliphatic amines also have a relatively short pot life, on the order of only 3 to 5 days.

U.S. Pat. No. 4,399, 553 also teaches a water based fluoroelastomer coating composition containing partially or completely hydrolyzed aminosilane compounds, with or without additional amine compounds, as curing agents. These aqueous dispersions are taught to have a pot life of up to one month at 25° C.

Thus, although water based fluoroelastomer coating compositions are known, a need still exists for a water based fluoroelastomer coating composition having improved pot life, excellent stability, and which produces cured films with excellent adhesion to a wide variety of substrates.

SUMMARY OF INVENTION

It is, therefore, a primary object of the present invention to provide water-borne fluoroelastomer coating compositions.

It is another object of the present invention to provide water-borne fluoroelastomer coating compositions that have an improved pot life.

It is yet another object of the present invention to provide water-borne fluoroelastomer coating compositions that produce a cured coating or film that adheres to a variety of substrates.

It is a further object of the present invention to provide water-borne fluoroelastomer coating compositions containing essentially no volatile organic compounds.

It is still another object of the present invention to provide water-borne fluoroelastomer coating compositions that produce a cured coating or film that exhibits good abrasion resistance and provides protection against a wide variety of solvents and chemicals.

It is yet a further object of the present invention to provide water-borne fluoroelastomer coating compositions that do not contain metallic oxides commonly used as acid acceptors in fluoroelastomer compositions.

At least one or more of the foregoing objects of the present invention, together with the advantages thereof over existing fluoroelastomer coating compositions and water-borne fluoroelastomer coating compositions that shall become apparent from the specification that follows, are accomplished by the invention as hereinafter described and claimed.

In general, the present invention provides a water-borne fluoroelastomer coating composition comprising an aqueous dispersion of a fluoroelastomer polymer; from about 0.1 to about 10 parts by weight of an amino/polyamino-siloxane curative per 100 parts by weight of the polymer; and, from 0 to about 40 parts by weight of an additive filler, per 100 parts by weight of the polymer, and sufficient water to provide a coating composition having a solids content of from about 10 to about 80 percent by weight.

The present invention also provides a method of coating a substrate comprising the steps of applying a water-borne fluoroelastomer coating composition to a substrate, wherein the water-borne fluoroelastomer coating composition comprises an aqueous dispersion of a fluoroelastomer polymer and an aminolpolyamino-siloxane curative.

The present invention further provides a cured fluoroelastomer film comprising a layer of fluoroelastomer wherein said fluoroelastomer has been cured with an amino/polyamino-siloxane curative.

PREFERRED EMBODIMENT FOR CARRYING OUT THE INVENTION

The present invention is directed toward water-borne fluoroelastomer coating compositions. The fluoroelastomer coating compositions are water-borne inasmuch as the compositions are based on aqueous dispersions or lattices of fluoroelastomer polymers. The fluoroelastomer polymers can include any copolymerizable monomers, but preferably include copolymers of vinylidene fluoride and hexafluoropropylene, or terpolymers of vinylidene fluoride, hexafluoropropylene and tetrafluoroethylene. Other examples of fluoroelastomers include those modified with monomers that provide enhanced properties, e.g., copolymerization with perfluoro(methylvinylether)to improve low temperature performance. Mixtures of the above fluoroelastomers may also be employed.

The fluoroelastomer coating compositions of the present invention further include an improved amino or polyamino-siloxane curative, referred to hereinafter as an amino/ polyamino-siloxane curative. Unlike the curatives employed heretofore in the art, the curative of the present invention is a terminated, stabilized, oligomeric, amino/polyamino-siloxane wherein the degree of polymerization of the oligomeric siloxane is essentially limited.

It should be appreciated that silanes readily undergo hydrolysis in water to produce silanols. The silanol groups will also self condense to form siloxane oligomers. The self condensation continues beyond the soluble dimer and trimer to yield insoluble tetramers and higher, including branched and cyclic species. It is believed that these insoluble compounds deleteriously affect the ability of the oligomer to cure the fluoroelastomer coating compositions. It has now been found that the use of stabilized, oligomeric, amino/polyamino-siloxanes, limited to a trimer or smaller, can produce water-borne fluoroelastomer coating compositions having improved pot-life and improved adhesion over the water-borne fluoroelastomer coating compositions known heretofore in the art.

Limiting the amino/polyamino-siloxane curative to a trimer or smaller provides for excellent adhesion between the fluoroelastomer coating and the substrate. This is believed to result from the fact that termination and stabilization of each amino/polyamino-siloxane curative molecule increases the proportional silanol concentration of each molecule, the silanol groups being reactive sites for bonding to various substrates.

Without wishing to be bound by any particular belief or theory, it is nevertheless believed that the hydrolyzed amino/polyamino-siloxanes are stabilized, and thus prohibited from further polymerization or self-condensation, as a result of other constituents present in the aqueous solution containing the siloxanes. For example, hydrolyzed alkoxysilanes, which are inhibited from further self-condensation by using an emulsifier, are disclosed in U.S. Pat. No. 5,552,476. Also, European Published Application 675,128 discloses stable, water-borne silane compounds.

Preferably, the degree of polymerization of the amino/polyamino-siloxane curative of the present invention is essentially limited to a trimer. Specifically, the curative is a water soluble oligomer that can be defined by the formula (I)

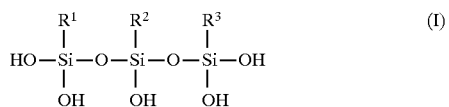

wherein $R^1$, $R^2_1$ and $R^3$ are the same or different and are selected from the group consisting of amino groups, organic moieties and hydrogen, with the proviso that at least one of $R^1$, $R^2$ and $R^3$ contain an amino group. The functionality, size and/or configuration of each of $R^1$, $R^2$ and $R^3$, individually or in combination, must be such that the oligomer is soluble in water or aqueous mediums (soluble hereinafter). Inasmuch as a multitude of amino/polyamino-siloxanes can fall within the parameters set forth in formula (I), it should be appreciated that a mixture of siloxanes, all generally defined by formula (I), can be employed in the present invention.

Amino groups, as stated above, include primary and secondary amino groups, as well as primary and secondary amine substituted organic moieties. Amino groups also include polyamino groups, which can include both primary amino and secondary amino groups. Polyamino groups typically include primary and secondary amine substituted organic moieties. Preferably, the amino groups are primary amine groups, primary amine substituted organic moieties or polyamino substituted organic moieties.

Organic moieties refer to alkyls, alkenes and alkynes, which can be straight or branched. It is contemplated that these moieties can also be cyclic and aromatic. It should further be understood that the organic moieties can include hetero atoms, such as oxygen or sulfur, so long as the presence of these atoms does not have a deleterious affect on the oligomer or the composition of the present invention. Preferably, the organic moieties are alkyls.

Regarding the proviso that at least one of $R^1$, $R^2$, and $R^3$ contain an amino group, it is preferred that the amino/polyamino-siloxane curative contain at least two reactive amine functionalities so as to best achieve crosslinking of the fluoroelastomer monomers. This is achieved through at least two amino groups on separate side-chains or through at least two amino groups on at least one side-chain, i.e. a polyamino group. The use of reactive amino functionalities refers to primary or secondary amino groups, with primary amino groups being preferred. Accordingly, it is preferred that at least two of $R^1$, $R^2$ and $R^3$ contain amino groups or at least one of $R^1$, $R^2$ and $R^3$ contain a polyamino group.

For example, substituents $R^1$, $R^2$, and $R^3$ can be defined according to the following formula (II)

wherein $R^4$ is a divalent organic moiety as defined hereinabove; $R^5$ is selected from hydrogen, organic moieties as defined hereinabove; and n is 0 or 1. It is preferred that n is 1 and that $R^4$ is an alkyl. It should be understood that where $R^1$, $R^2$, or $R^3$ are hydrogen, formula (II) is not representative.

It should be appreciated that those skilled in the art, without undue experimentation, can readily determine the maximum size and/or appropriate configuration of substituents $R^1$, $R^2$, and $R^3$ permissible without rendering the oligomer insoluble in aqueous media. It should be understood that the size of the substituent refers to the number of carbon atoms therein.

Without wishing to be bound by any particular size and/or molecular weight, it is believed that each of $R^1$, $R^2$ and $R^3$ can include up to about 6 carbon atoms without rendering the molecule insoluble. The skilled artisan will appreciate that solubility will improve with fewer carbon atoms, as well as with the addition of substituents such as nitrogen and oxygen atoms. The amount of branching will also affect the solubility. Thus, the skilled artisan may be able to synthesize larger molecules by adding other substituents and/or changing the chemical structure of $R^1$, $R^2$ or $R^3$. Furthermore, although the size of any given substituent, e.g. $R^1$, can fluctuate based on the size of the complementary substituent groups, e.g. $R^2$ and $R^3$, it is believed, and thus preferred that the oligomer employed in the present invention contain less than about 20 carbon atoms, more preferably less than 15 carbon atoms, and even more preferably less than 12 carbon atoms. Again, it should be understood that larger molecules, so long as they are soluble, are contemplated.

One such oligomeric siloxane is the diamino-siloxane sold by Hüls America, Inc. under the name Hydrosil® 2776. This curative is hydrolyzed, terminated and stabilized to contain essentially diamino-siloxanes that are trimers or smaller. It should be appreciated that although Hydrosil 2776 is an example of a preferred embodiment, any stabilized amino or polyamino-siloxane meeting the above criteria can be used.

Optionally, the fluoroelastomer coating compositions of the present invention may further include various fillers.

These fillers can include carbon black, mineral fillers (clays, synthetic silicates, whiting, barytes, and the like), color pigments (preferably inorganic and heat resistant), glass micro beads and short, chopped fibers, as well as materials to modify resistivity, such as metal powders, graphite and the like. Other examples include those materials used as fillers in rubber, plastic and coating formulations. These fillers are well known and documented in the art. In essence, any material that does not adversely affect the chemical and physical performance of the coating can be used as a filler. It should be appreciated that the presence or absence of any fillers and pigments typically does not affect the performance of the coating. Of course, the total amount of filler added will be limited by its effect on viscosity, film formation capabilities and other properties of the fluoroelastomer coating. Additional ingredients such as surfactants, viscosity modifiers and the like may be added if deemed necessary to control the liquid coating properties.

The solids content of the fluoroelastomer coating compositions of the present invention is typically in the range from about 10 to about 80 percent by weight based on the total weight of the coating composition, and preferably from about 60 to about 70 percent by weight based on the total weight of the coating composition. By solids is meant the fluoroelastomer polymers, fillers, curatives and any other solid component of the coating composition.

The solids component of the coating composition of the present invention typically contains 100 parts by weight polymer or rubber, from 0 to about 40 parts by weight filler per hundred parts by weight polymer or rubber (phr) and from about 0.1 to 10 parts by weight curative phr. Accordingly, the fluoroelastomer coating composition of the present invention will typically include from about 25 to about 1,350 parts by weight water phr, from 0 to about 40 parts by weight filler phr, and from about 0.1 to about 10 parts by weight curative phr. Preferably, the fluoroelastomer coating composition of the present invention will include from about 50 to about 95 parts by weight water phr, from 0 to about 40 parts by weight filler phr, and from about 0.1 to about 1.8 parts by weight curative phr.

The coating compositions may be prepared by mixing the fluoroelastomer aqueous dispersion, curative(s), filler(s) and other desired additive(s) in a ball mill or other suitable mixing equipment. The conditions of mixing are dependent upon the coating composition ingredients and can be readily determined by those with skill in the art, without undue experimentation. The coating composition mixture is preferably filtered to remove any undispersed particles. The water-borne fluoroelastomer coating compositions of the present invention may be sprayed, dipped, brushed or applied in any similar fashion to form a film on the desired substrate which can include metal, rubber, plastic, concrete or other such surfaces. The film is typically dried at ambient temperatures, or in an oven at about 60° C. to about 70° C., and then cured at higher temperatures. Preferably the curing takes place at about 100° C. for about one hour.

In order to demonstrate a practice of the present invention, the following examples are provided. It should be appreciated that the examples are not to be viewed as limiting the invention as disclosed herein, the claims serving to define the invention.

EXAMPLES

Three water-borne fluoroelastomer coating compositions having varying amounts of curative were prepared according to the present invention. The composition of each coating is represented in Table I.

TABLE I

WATER-BORNE FLUOROELASTOMER COATING COMPOSITIONS

| Constituent | Examples (parts by weight) | | |
|---|---|---|---|
| | 1 | 2 | 3 |
| Water-borne fluoroelastomer dispersion, 65% solids content | 153.8 | 153.8 | 153.8 |
| Medium Thermal Carbon Black | 20.0 | 20.0 | 20.0 |
| Hydrosil ® 2776, 23–25% active | 7.5 | 10.0 | 15.0 |
| Water (to maintain solids) | 6.4 | 4.8 | 1.6 |
| Triton ® X-100 (nonionic surfactant manufactured by Rohm and Haas Co.) | 0.5 | 0.5 | 0.5 |

Upon preparation of each fluoroelastomer coating composition, a film was prepared using a portion of the coating composition by pouring the coating onto a Mylar® film, drawing the coating down to a uniform thickness and allowing the film to dry at ambient temperatures. The dry films were then cured in an oven for one hour at 100° C. From these films, original tensile strength data was obtained as represented in Table II.

The remainder of the coating compositions prepared above were placed in closed containers and aged at room temperature for up to four months or longer. During this time, the coating compositions were examined on a regular basis to detect any signs of gelation. Upon the first indication of gelation, a film was prepared as above by pouring the coating composition onto a Mylar® film, drawing the coating down to uniform thickness and allowing the film to dry at ambient temperatures. These films were also cured in an oven for an hour at 100° C. The films prepared from the aged coating material had appearance and properties similar to films from the freshly prepared coatings as generally represented from the tensile strength as displayed in Table II. Also represented in Table II is the time in months in which it took the fluoroelastomer coating compositions prepared above to begin gelation.

TABLE II

PHYSICAL PROPERTIES

| Property | Examples | | |
|---|---|---|---|
| | 1 | 2 | 3 |
| Gelation (months) | >4.0 | >3.0 | >1.0 |
| Tensile Strength (psi) | | | |
| Original | 1101 | 1054 | 1010 |
| Aged | 1048 | 894 | 1100 |
| Elongation at Break (%) | | | |
| Original | 677 | 604 | 577 |
| Aged | 691 | 515 | 374 |

Generally, the pot life of a solvent based or water-borne fluoroelastomer coating composition is related to the amount of curative present. The above examples illustrate that this relationship also occurs for the stabilized oligomeric diamino-siloxane, Hydrosil® 2776. Surprisingly, however, the use of an oligomeric diamino-siloxane, such as Hydrosil® 2776, provided a pot life ranging from 5 to more than 16 weeks in length. Specifically, Examples 1 and 2 show that the curative levels employed had a pot life of more than 3 to 4 months and produced cured films with more than adequate tensile properties.

Comparative examples employing N-(2-aminoethyl)-3-aminopropyltrimethoxysilane, 1,6-hexanediamine, and triethylenetetramine as curatives were prepared and tested. The composition of each coating is represented in Table III.

TABLE III

COMPARISONS WITH OTHER CURATIVES

| Constituent | Examples (parts by weight) | | |
|---|---|---|---|
| | 1 | 2 | 3 |
| Water-borne fluoroelastomer dispersion, 65% solids content | 153.8 | 153.8 | 153.8 |
| Medium Thermal Carbon Black | 20.0 | 20.0 | 20.0 |
| 1,6-hexanediamine | 2.0 | — | — |
| Triethylenetetramine | — | 5.0 | — |
| N-(2-aminoethyl)-3-aminopropyltrimethoxysilane | — | — | 5.0 |
| Water (to maintain solids) | 12.2 | 13.8 | 13.8 |
| Triton ® X-100 (nonionic surfactant manufactured by Rohm and Haas Co.) | 0.5 | 0.5 | 0.5 |

Water-borne fluoroelastomer coating compositions prepared using 1,6-hexanediamine produced gelation within 2 to about 5 days, and those prepared using triethylenetetramine produced gelation within 2 to about 5 days. Gelation time for N-(2-aminoethyl)-3-aminopropyltrimethoxysilane was not obtained in view of the following findings.

It is believed that N-(2-aminoethyl)-3-aminopropyltrimethoxysilane is sold under the tradename Z-6020 by Dow Corning of Midland, Mich. This curative was mixed into an aqueous dispersion of fluoroelastomer and within one day a film was cast, dried and cured for one hour at 100° C. Three days later another film was cast from the same catalyzed coating and cured for one hour at 100° C. The tensile properties of the cured coatings are represented in Table IV.

TABLE IV

COMPARATIVE PHYSICAL PROPERTIES

| Property | | Z-6020 |
|---|---|---|
| Aging (day) | <1 | 3 |
| Tensile Strength (psi) | 1150 | 490 |
| Elongation at Break (%) | 300 | 960 |

As is clearly indicated by the data in Table IV, the cured fluoroelastomer coating composition prepared using a three day old composition demonstrated tensile properties that were inferior to those obtained employing the fluoroelastomer coating compositions of the present invention. Indeed, the tensile properties of the cured coatings or films prepared using the fluoroelastomer coating composition of the present invention were superior even though the coating composition of the present invention was allowed to age for up to four months.

Thus it should be evident that the composition of the present invention is improved over known water-borne fluoroelastomer coating compositions.

Based upon the foregoing disclosure, it should now be apparent that the water-borne fluoroelastomer coating compositions described herein will carry out the objects set forth hereinabove. It is, therefore, to be understood that any variations evident fall within the scope of the claimed invention and thus, the selection of specific component elements can be determined without departing from the spirit of the invention herein disclosed and described. In particular, the water-borne fluoroelastomer coating compositions according to the present invention are not necessarily limited to those including a specific fluoroelastomer or a specific stabilized, oligomeric, amino/polyamino-siloxane curative. Furthermore, it should be understood that the ranges specifying carbon content or amount of constituent or reagent, necessarily include the members or amounts within those ranges. Thus, the scope of the invention shall include all modifications and variations that may fall within the scope of the attached claims.

What is claimed is:

1. A water-borne fluoroelastomer coating composition comprising:

an aqueous dispersion of a fluoroelastomer polymer;

from about 0.1 to about 10 parts by weight of a water soluble, stabilized amino/polyamino-siloxane curative per 100 parts by weight of said polymer; and, from 0 to about 40 parts by weight of an additive filler, per 100 parts by weight of said polymer; wherein there is sufficient water to provide a coating composition having a solids content of from about 10 to about 80 percent by weight.

2. A water-borne fluoroelastomer coating composition, as set forth in claim 1, wherein said fluoroelastomer is selected from the group consisting of copolymers of vinylidene fluoride and hexafluoropropylene, terpolymers of vinylidene fluoride, hexafluoropropylene and tetrafluoroethylene, and mixtures thereof.

3. A water-borne fluoroelastomer coating composition, as set forth in claim 1, wherein the water-borne fluoroelastomer is essentially devoid of volatile organic solvents.

4. A water-borne fluoroelastomer coating composition, as set forth in claim 1, wherein said amino/polyamino-siloxane curative is an oligomer, wherein the degree of polymerization of the siloxane is essentially limited to a trimer.

5. A water-borne fluoroelastomer coating composition, as set forth in claim 4, wherein said amino/polyamino-siloxane curative is water soluble and defined by the formula (I)

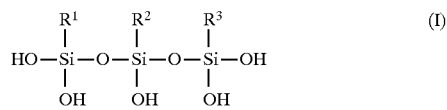

wherein $R^1$, $R^2$, and $R^3$ are the same or different and are selected from the group consisting of amino groups, organic moieties and hydrogen, with the proviso that at least one of $R^1$, $R^2$ and $R^3$ contain an amino group.

6. A water-borne fluoroelastomer coating composition, as set forth in claim 5, wherein at least two of $R^1$, $R^2$ and $R^3$ contain amino groups or at least one of $R^1$, $R^2$ and $R^3$ contain a polyamino group.

7. A water-borne fluoroelastomer coating composition, as set forth in claim 5, wherein at least one of $R^1$, $R^2$ and $R^3$ are defined by the formula (II)

wherein $R^4$ is a divalent organic moiety, $R^5$ is selected from hydrogen, organic moieties, and amino groups, and n is 0 or 1.

8. A water-borne fluoroelastomer coating composition, as set forth in claim 1, wherein said filler is selected from the group consisting of carbon black, mineral fillers, clays, synthetic silicates, whiting, barytes, color pigments, glass micro beads, short, chopped fibers, metal powders, graphite and mixtures thereof.

9. A method of coating a substrate comprising the steps of:
applying a water-borne fluoroelastomer coating composition to a substrate, wherein the water-borne fluoroelastomer coating composition comprises an aqueous dispersion of a fluoroelastomer polymer; from about 0.1 to about 10 parts by weight of a water soluble, stabilized amino/polyamino-siloxane curative per 100 parts by weight of the polymer; and,
from 0 to about 40 parts by weight of an additive filler, per 100 parts by weight of the polymer, and sufficient water to provide a coating having a solids content of from about 10 to about 80 percent by weight.

10. A method of coating a substrate, as set forth in claim 9, wherein the fluoroelastomer is selected from the group consisting of copolymers of vinylidene fluoride and hexafluoropropylene, terpolymers of vinylidene fluoride, hexafluoropropylene and tetrafluoroethylene, and mixtures thereof.

11. A method of coating a substrate, as set forth in claim 9, wherein the amino/polyamino-siloxane curative is an oligomer, wherein the degree of polymerization of the siloxane is essentially limited to a trimer.

12. A method of coating a substrate, as set forth in claim 11, wherein the amino/polyamino-siloxane curative is soluble and defined by the formula (I)

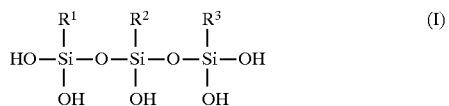

wherein $R^1$, $R^2$, and $R^3$ are the same or different and are selected from the group consisting of amino groups and hydrogen, with the proviso that at least one of $R^1$, $R^2$ and $R^3$ contain an amino group.

13. A method of coating a substrate, as set forth in claim 12, wherein at least two of $R^1$, $R^2$ and $R^3$ contain amino groups or at least one of $R^1$, $R^2$ and R3 contain a polyamino groups.

14. A method of coating a substrate, as set forth in claim 12, wherein $R^1$, $R^2$ and $R^3$ are defined by the formula (II)

wherein $R^4$ is a divalent organic moiety, $R^5$ is selected from hydrogen, organic moieties, and amino groups, and n is 0 or 1.

15. A method of coating a substrate, as set forth in claim 9, wherein said filler is selected from the group consisting of carbon black, mineral fillers, clays, synthetic silicates, whiting, barytes, color pigments, glass micro beads, short, chopped fibers, metal powders, graphite and mixtures thereof.

16. A cured fluoroelastomer film comprising a layer of fluoroelastomer wherein said fluoroelastomer has been cured with from about 0.1 to about 10 parts by weight of an amino/polyamino-siloxane curative per 100 parts by weight of the fluoroelastomer, wherein the amino siloxane is water soluble.

17. A cured fluoroelastomer film, as set forth in claim 16, wherein said fluoroelastomer is selected from the group consisting of copolymers of vinylidene fluoride and hexafluoropropylene, terpolymers of vinylidene fluoride, hexafluoropropylene and tetrafluoroethylene, and mixtures thereof.

18. A cured fluoroelastomer film, as set forth in claim 16, wherein said amino/polyamino-siloxane curative is soluble and defined by the formula (I)

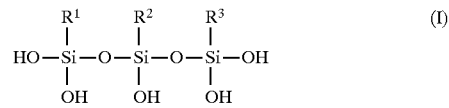

wherein $R^1$, $R^2$, and $R^3$ are the same or different and are selected from the group consisting of amino groups, organic moieties and hydrogen, with the proviso that at least one of $R^1$, $R^2$ and $R^3$ contain an amino group.

19. A cured fluoroelastomer film, as set forth in claim 18 wherein at least two of $R^1$, $R^2$ and $R^3$ contain amino groups or at least one of $R^1$, $R^2$ and $R^3$ contain a polyamino groups.

20. A cured fluoroelastomer film, as set forth in claim 16, wherein the amino/polyamino-siloxane curative is an oligomer, wherein the degree of polymerization of the siloxane is essentially limited to a trimer.

21. A cured fluoroelastomer film, as set forth in claim 16, wherein the film further comprises a filler selected from the group consisting of carbon black, mineral fillers, clays, synthetic silicates, whiting, barytes, color pigments, glass micro beads, short, chopped fibers, metal powders, graphite and mixtures thereof.

22. A cured fluoroelastomer film prepared by:
applying a water-borne fluoroelastomer coating composition to a substrate, wherein the water-borne fluoroelastomer coating composition comprises an aqueous dispersion of a fluoroelastomer polymer and from about 0.1 to about 10 parts by weight of a water soluble, stabilized amino/polyamino-siloxane curative per 100 parts by weight of the polymer.

23. A cured fluoroelastomer film, as set forth in claim 22, wherein the amino/polyamino-siloxane curative is an oligomer, wherein the degree of polymerization of the siloxane is essentially limited to a trimer.

24. A water-borne fluoroelastomer coating, as set forth in claim 1, wherein said additive filler comprises materials to modify resistivity.

25. A method of coating a substrate, as set forth in claim 9, wherein said additive filler comprises materials to modify resistivity.

26. A cured fluoroelastomer film, as set forth in claim 16, wherein said additive filler comprises materials to modify resistivity.

* * * * *